(12) United States Patent
McCusker et al.

(10) Patent No.: US 10,170,010 B1
(45) Date of Patent: Jan. 1, 2019

(54) DISPLAY OF TRAFFIC OVERLAID ON AERONAUTICAL CHART

(71) Applicant: Rockwell Collins, Inc., Cedar Rapids, IA (US)

(72) Inventors: Patrick D. McCusker, Walker, IA (US); Douglas A. Bell, Marion, IA (US); Travis S. Vanderkamp, Marion, IA (US); Sarah Barber, Cedar Rapids, IA (US); Michael J. Schmitt, Cedar Rapids, IA (US); Brent J. Nelson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/002,767

(22) Filed: Jun. 7, 2018

(51) Int. Cl.
*G08G 5/04* (2006.01)
*G08G 5/00* (2006.01)
*B64D 43/00* (2006.01)
*G06F 3/0482* (2013.01)

(52) U.S. Cl.
CPC ............. *G08G 5/045* (2013.01); *B64D 43/00* (2013.01); *G08G 5/0008* (2013.01); *G08G 5/0021* (2013.01); *G06F 3/0482* (2013.01)

(58) Field of Classification Search
CPC ..... G08G 5/045; G08G 5/0008; G08G 5/0021
USPC .......... 340/961, 870.41, 969, 970, 974, 978, 340/985; 342/30, 36, 37, 42
See application file for complete search history.

(56) References Cited

U.S. PATENT DOCUMENTS

| | | | |
|---|---|---|---|
| 8,102,301 B2* | 1/2012 | Mosher | G08G 5/0013 342/30 |
| 2011/0270472 A1* | 11/2011 | Shafaat | G08G 5/0008 701/4 |
| 2016/0180715 A1* | 6/2016 | Burke | G08G 5/0008 701/467 |

* cited by examiner

*Primary Examiner* — Tai T Nguyen
(74) *Attorney, Agent, or Firm* — Angel N. Gerdzhikov; Donna P. Suchy; Daniel M. Barbieri

(57) ABSTRACT

A system may include a display, an avionics server, and an automatic dependent surveillance-broadcast (ADS-B) receiver implemented in an aircraft. The avionics server may include a processor configured to host applications. The ADS-B receiver may be configured to receive ADS-B In data associated with traffic information from other aircraft in a vicinity of the aircraft. Execution of the applications may be configured to cause the processor to: generate geo-referenced aeronautical chart graphics data; output the geo-referenced aeronautical chart graphics data to the display; receive the ADS-B In data from the ADS-B receiver; generate geo-referenced traffic graphics data based on the received ADS-B In data; and output the geo-referenced traffic graphics data to the display. The display may be configured to receive the geo-referenced aeronautical chart graphics data and the geo-referenced traffic graphics data and display an image of a selected aeronautical chart overlaid with the traffic information.

20 Claims, 7 Drawing Sheets

DISPLAY OF TRAFFIC OVERLAID ON AERONAUTICAL CHART

BACKGROUND

In a typical small business jet, there are three forward display units that provide information required to aviate, navigate, and communicate during flight operations. Typically, the two outboard displays are used for "aviate" purposes with some capability to display navigation data. Typically, the center display is used for "navigate" and "communicate" purposes with any additional capability desired by the developer of the aircraft (e.g., maintenance functions).

Traditionally, the traffic collision avoidance system (TCAS) receives information regarding the range, elevation, and bearing of other traffic which is then rendered into a basic display of traffic information. This is generally indicated on a navigation map on the center display, but may also be indicated on a horizontal situation indicator (HSI) within one of the outboard displays (e.g., a primary flight display). Aeronautical charts are typically displayed at the same time as the navigation map in an independent window.

The emerging surveillance technology of Automatic Dependent Surveillance-Broadcast (ADS-B) requires each aircraft to transmit detailed information regarding such aircraft's position and intent. The ADS-B transmissions include more information than can normally be determined using a traditional TCAS. The indication of ADS-B's improved set of information can provide greater situation awareness to the pilot. However, the introduction of ADS-B In (inbound) applications (e.g., applications where ownship uses the ADS-B data received from other aircraft) into the field is occurring very slowly, primarily due to the cost of implementing ADS-B functions and modifying installed avionics systems (e.g., the forward displays and the TCAS receiver). Retrofitting ADS-B In applications into older system architectures is cost prohibitive and is unlikely to occur without a mandate from the regulatory authorities.

SUMMARY

In one aspect, embodiments of the inventive concepts disclosed herein are directed to an aircraft system. The aircraft system may include a display, an avionics server, and an automatic dependent surveillance-broadcast (ADS-B) receiver. The display may be implemented in a cockpit of an aircraft and configured to present images to a pilot. The avionics server may be implemented in the aircraft and communicatively coupled to the display. The avionics server may include a processor configured to host at least one application and execute the at least one application. The ADS-B receiver may be implemented in the aircraft and communicatively coupled to the avionics server. The ADS-B receiver may be configured to receive ADS-B In data associated with ADS-B traffic information from other aircraft in a vicinity of the aircraft and output the ADS-B In data to the avionics server. Execution of the at least one application may be configured to cause the processor to: generate geo-referenced aeronautical chart graphics data associated with a selected aeronautical chart; output the geo-referenced aeronautical chart graphics data to the display; receive the ADS-B In data from the ADS-B receiver; generate geo-referenced traffic graphics data based on the received ADS-B In data, the geo-referenced traffic graphics data associated with at least a portion of the ADS-B traffic information of the other aircraft in the vicinity of the aircraft; and output the geo-referenced traffic graphics data to the display. The display may be configured to receive the geo-referenced aeronautical chart graphics data and the geo-referenced traffic graphics data and to display at least one image of the selected aeronautical chart overlaid with at least a portion of the ADS-B traffic information.

In a further aspect, embodiments of the inventive concepts disclosed herein are directed to an aircraft system. The aircraft system may include a display, an avionics server, and an automatic dependent surveillance-broadcast (ADS-B) receiver. The display may be implemented in a cockpit of an aircraft and configured to present images to a pilot. The display may be a multi-function display. The avionics server may be implemented in the aircraft and communicatively coupled to the display. The avionics server may include a processor configured to host an ADS-B In application and an aeronautical chart application and execute the ADS-B In application and the aeronautical chart application. The ADS-B receiver may be implemented in the aircraft and communicatively coupled to the avionics server. The ADS-B receiver may be configured to receive ADS-B In data associated with ADS-B traffic information from other aircraft in a vicinity of the aircraft and output the ADS-B In data to the avionics server. The ADS-B receiver may be uncertified by the Federal Aviation Administration. Execution of the ADS-B In application and the aeronautical chart application may be configured to cause the at least one processor to: generate geo-referenced aeronautical chart graphics data associated with a selected aeronautical chart; output the geo-referenced aeronautical chart graphics data to the display; receive the ADS-B In data from the ADS-B receiver; generate geo-referenced traffic graphics data based on the received ADS-B In data, the geo-referenced traffic graphics data associated with at least a portion of the ADS-B traffic information of the other aircraft in the vicinity of the aircraft; and output the geo-referenced traffic graphics data to the display. The display may be configured to: receive the geo-referenced aeronautical chart graphics data and the geo-referenced traffic graphics data; and display an image of the selected aeronautical chart overlaid with at least a portion of the ADS-B traffic information.

In a further aspect, embodiments of the inventive concepts disclosed herein are directed to a method of operating an aircraft system. The method may include executing at least one application, by a processor of an avionics server, the avionics server implemented in an aircraft and communicatively coupled to a display, the avionics server including the processor configured to host the at least one application. The method may further include receiving, by an automatic dependent surveillance-broadcast (ADS-B) receiver, ADS-B In data associated with ADS-B traffic information from other aircraft in a vicinity of the aircraft, the ADS-B receiver implemented in the aircraft and communicatively coupled to the avionics server. The method may further include outputting, by the ADS-B receiver, the ADS-B In data to the avionics server. Execution of the at least one application may cause the processor to perform operations, the operations including: generating geo-referenced aeronautical chart graphics data associated with a selected aeronautical chart; outputting the geo-referenced aeronautical chart graphics data to the display; receiving the ADS-B In data from the ADS-B receiver; generating geo-referenced traffic graphics data based on the received ADS-B In data, the geo-referenced traffic graphics data associated with at least a portion of the ADS-B traffic information of the other aircraft in the vicinity of the aircraft; and outputting the geo-referenced traffic graphics data to the display. The method may further include receiving, by the display, the geo-referenced aeronautical chart graphics data and the geo-referenced traffic graphics data, wherein the display is implemented in a cockpit of the aircraft, the display configured to present images to a pilot. The method may further include displaying, by the display, at least one image of the selected aeronautical chart overlaid with at least a portion of the ADS-B traffic information.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
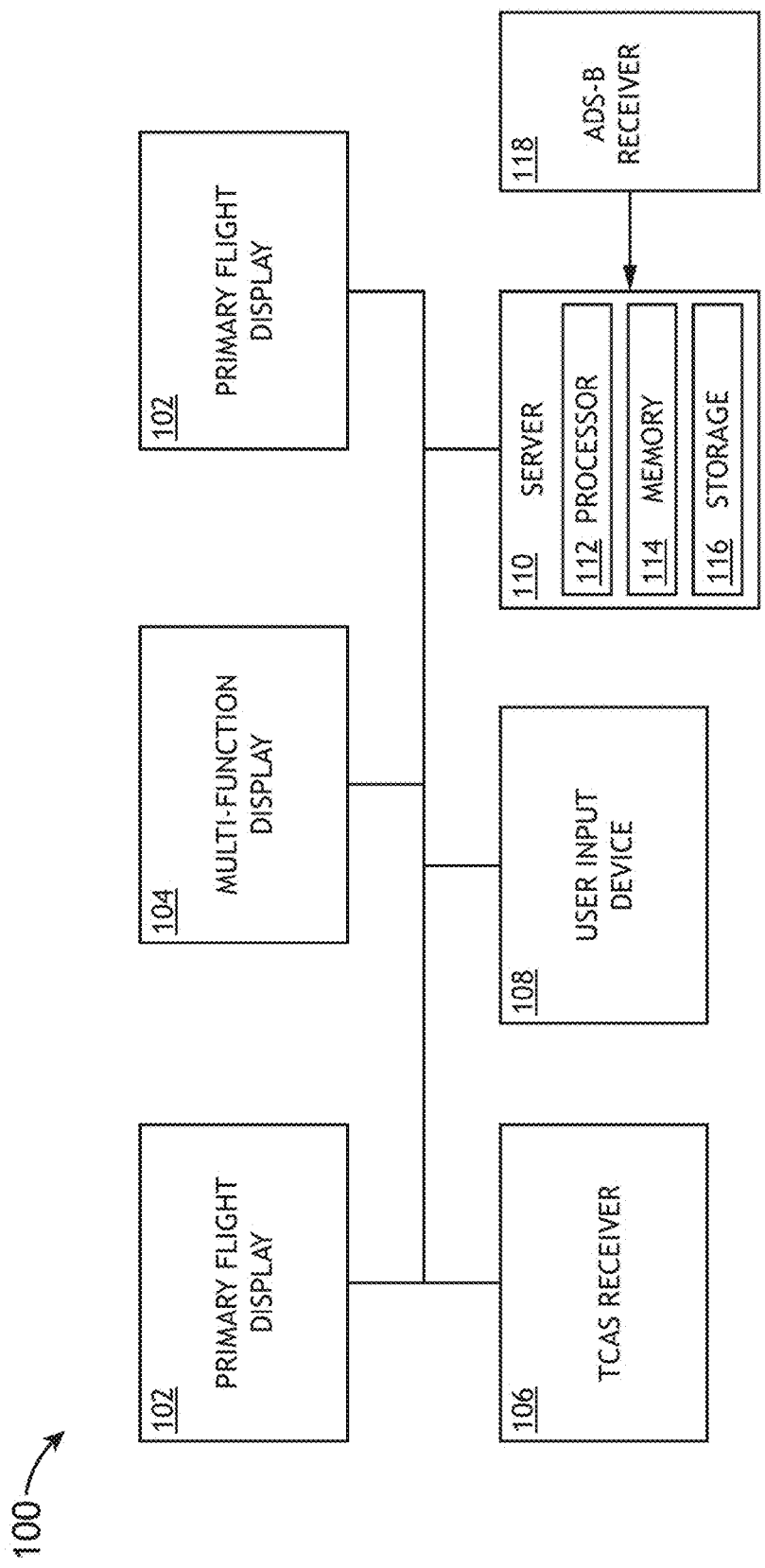
FIG. 1 is a view of an exemplary embodiment of a system implemented in an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and a method to indicate traffic in a vicinity of ownship. Some embodiments may utilize a low-cost ADS-B In application (Cockpit Display of Traffic Information (CDTI) executed by an avionics computing device (e.g., an avionics server) to display traffic information (CDTI) to a pilot so as to retrofit aircraft otherwise lacking full ADS-B capabilities. Embodiments may improve the field of aviation by improving safety and improving a pilot's situational awareness of traffic in an aircraft's vicinity.

Some embodiments may include execution of software by an avionics computing device (e.g., a server) to render aeronautical charts with ADS-B information to be displayed on a forward display of a cockpit. In some embodiments, the software for rendering aeronautical charts with ADS-B information would not need to be specifically certified by a regulatory authority, such as the Federal Aviation Administration (FAA). For example, such software may be "uncertified" as the software may be considered to be hosted software (e.g., software hosted by a certified avionics server). Such hosted software can be modified and updated outside normal configuration management processes for the software included in installed certified equipment (e.g., a certified server). In some embodiments, regulatory authority certification requirements, such as FAA certification requirements, would be minimized as the software running on the server would comport with the certification requirements.

In some embodiments, hosting "uncertified" software in an installed server dramatically reduces the cost and speeds up the schedule of rolling out new features into the hosted applications. For example, an ADS-B In application can be created and installed on the server much faster and much cheaper than if the application was integrated into the TCAS receiver and Navigation Map functions. Additionally, because the ADS-B In application may be hosted on the server, other "uncertified" software (such as an aeronautical chart application) and a low-cost uncertified ADS-B receiver can be used to source data for the ADS-B In application.

Additionally, the ADS-B In application can be integrated with an aeronautical chart application such that graphical data of an aeronautical chart integrated with ADS-B information (e.g., ADS-B information overlaid on the aeronautical chart) can be output by the server to a forward display (e.g., a center multi-function display of three forward displays) for presentation to a pilot as a graphical depiction of the aeronautical chart integrated with ADS-B information. Because the ADS-B In application can be integrated with the aeronautical chart application, execution of the ADS-B In application and the aeronautical chart application may not interfere with the graphical depiction of traffic information on the certified navigation map, which sources data from the TCAS receiver, on another forward display (e.g., an outboard primary flight display of three forward displays). The ADS-B In application can be configured to (e.g., programmed to or programmably updated to) accommodate any of various ADS-B receivers on the market including uncertified ADS-B receivers.

For example, the avionics computing device (e.g., a server) may be configured to receive ADS-B In data from an ADS-B receiver (e.g., an uncertified ADS-B receiver). By executing the ADS-B In application, the server may be configured to utilize the ADS-B In data to generate traffic graphics data (e.g., traffic graphics commands) associated with aircraft traffic (e.g., obtained from the ADS-B In data) that may be output to a display (e.g., a center display of three forward displays of a cockpit). The display may be configured to interpret the traffic graphics data and render (e.g., overlay) the traffics information on top of a rendered aeronautical chart (e.g., received from the server by executing an aeronautical chart application). In some embodiments, the ADS-B In application is independent of the aeronautical chart application such that the server may output traffic graphics data to the display to display traffic information without being overlaid on an aeronautical chart.

The displays (e.g., any or all of three forward displays of a cockpit) may be configured for receiving and interpreting graphics data (e.g., graphics commands) from the server executing any of various hosted applications maintained in the server.

Additionally, a user input device (e.g., a cursor control device; e.g., a mouse, trackpad, a touch screen, an eye tracking system, and/or a voice recognition system) may be communicatively coupled to the displays and/or the server. The displays and/or the server may track user inputs, such as cursor movement and cursor events (e.g., clicks or selections), received from the user input device. For example, the user inputs may be received by the server and may be distributed to any or all hosted applications that are active at any given time. As such, by executing the ADS-B In application and receiving the user inputs in real time, the server may be configured generate and output traffic graphics data in real time, which may be fully interactive and usable in various flight conditions, such as in turbulent flight conditions; such embodiments, may improve the field of aviation by improving the operational safety of an aircraft.

Figure 2:
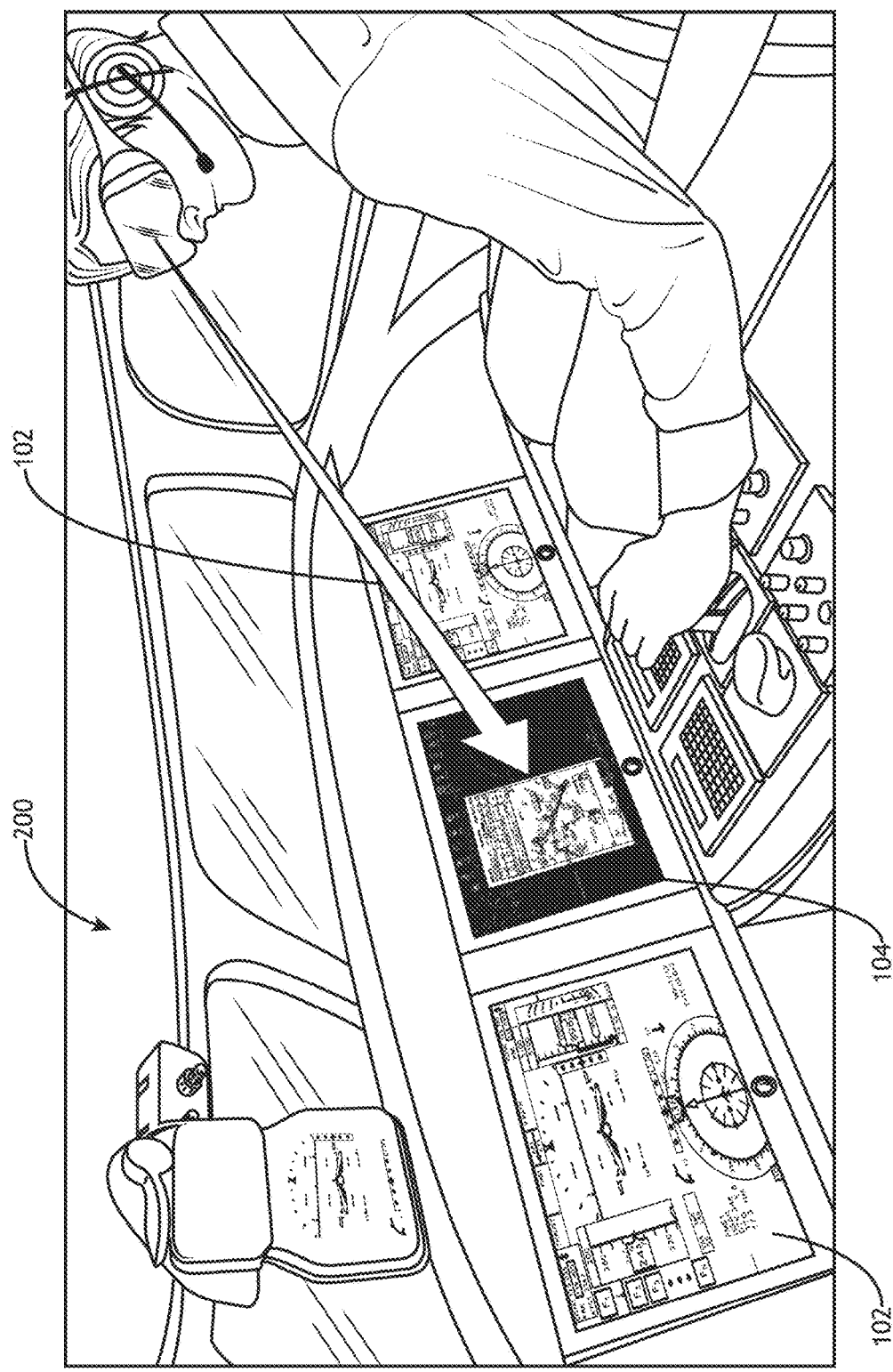
FIG. 2 is a view of a cockpit of an aircraft including displays of the system of FIG. 1 according to the inventive concepts disclosed herein.

Referring now to FIGS. 1-2, an exemplary embodiment of a system 100 (e.g., an aircraft system) implemented in an aircraft 200 according to the inventive concepts disclosed herein includes at least one display (e.g., three forward displays of a cockpit, such as two outboard primary flight displays 102 and a center multi-function display 104), a TCAS receiver 106, at least one user input device 108, at least one avionics computing device (e.g., an avionics server 110), and an ADS-B receiver 118, some or all of which may be communicatively coupled at any given time.

For example, a cockpit of the aircraft 200 may include a plurality of displays, such as three forward displays. Two outboard primary flight displays 102 may be configured to display an attitude director indicator (ADI), a horizontal situation indicator (HSI), and optionally TCAS targets, as well as other information. A center multi-function display 104 may be configured to display a navigation map and optionally TCAS targets. Additionally, the center multi-function display 104 may be configured to display an aeronautical chart overlaid with ADS-B targets. Additionally, while the center multi-function display 104 is exemplarily described as being configured to display an aeronautical chart overlaid with ADS-B targets, in some embodiments other displays (e.g., one or more of primary flight displays 102) may be configured as such.

Each of the displays may be configured to receive graphics data (e.g., graphics commands) and render graphics associated with such graphics data for display to a user (e.g., a pilot). For example, the center multi-function display 104 may be configured to receive ADS-B traffic graphics data associated with ADS-B traffic in a vicinity of the aircraft 200 and aeronautical chart data associated with an aeronautical chart, render graphics associated with such ADS-B traffic graphics data and aeronautical chart data, and display an aeronautical chart overlaid with ADS-B traffic information. Additionally, for example, the center multi-function display 104 may be configured to receive navigation map graphics data and TCAS target graphics data, to render graphics associated with such graphics data, and to display a navigation map and TCAS targets. Additionally, the displays may be configured to receive user inputs from the user input device 108 and change a display of content based on the user inputs, such as changing a cursor location. Each of the displays may include a processor, memory, and storage, which may be communicatively coupled. The processor may be configured to run various software applications or computer code stored (e.g., maintained) in a non-transitory computer-readable medium (e.g., memory or storage) and configured to execute various instructions or operations.

The TCAS 106 receiver may be configured to receive TCAS data from an offboard source (e.g., another aircraft), process the TCAS data, and output TCAS graphics data to one or more displays (e.g., two outboard primary flight displays 102 and a center multi-function display 104). The TCAS receiver 106 may include a processor, memory, and storage, which may be communicatively coupled. The processor may be configured to run various software applications or computer code stored (e.g., maintained) in a non-transitory computer-readable medium (e.g., memory or storage) and configured to execute various instructions or operations.

The at least one user input device 108 may be configured to receive user inputs from a user (e.g., a pilot) and output user input data to one or more displays (e.g., two outboard primary flight displays 102 and a center multi-function display 104) and/or the avionics server 110. The user input device may be configured as a cursor control device. For example, the at least one user input device 108 may be implemented as a cursor control device, a mouse, a trackpad, a touchscreen, an eye tracking system (e.g., comprising a processor and a sensor), and/or a voice recognition system (e.g., comprising a processor and a microphone). For example, the user input device 108 may output user input data to the displays and/or the server 110, which may track user inputs, such as cursor movement and cursor events (e.g., clicks or selections), received from the user input device 108.

The ADS-B receiver 118 may be configured to receive ADS-B In data associated with ADS-B traffic information from other aircraft and ground vehicles in the vicinity of the aircraft 200. The ADS-B traffic information may include detailed information of each other aircraft's position and intent. The ADS-B receiver 118 may be configured to output ADS-B In data to the server 110. In some embodiments, the ADS-B receiver 118 may be uncertified by the FAA or uncertified by the FAA to directly interface with one or more of the displays (e.g., two outboard primary flight displays 102 and a center multi-function display 104). As such, in some embodiments, the ADS-B receiver 118 does not directly interface with the displays and is not communicatively coupled to the displays. The ADS-B receiver 118 may include a processor, memory, and storage, which may be communicatively coupled. The processor may be configured to run various software applications or computer code stored (e.g., maintained) in a non-transitory computer-readable medium (e.g., memory or storage) and configured to execute various instructions or operations.

The avionics server 110 may include at least one processor 112, memory 114, and storage 116, as well as other components, equipment, and/or devices commonly included in an avionics computing device, all of which may be communicatively coupled to one another. The server 110 may be configured to output data to one or more displays (e.g., two outboard primary flight displays 102 and a center multi-function display 104) and/or the TCAS receiver 106. Likewise, the server 110 may be configured to receive data from the user input device 108, the TCAS receiver 106, one or more displays (e.g., two outboard primary flight displays 102 and a center multi-function display 104), and/or the ADS-B receiver 118. The processor 112 may be configured to run various software applications or computer code stored (e.g., maintained) in a non-transitory computer-readable medium (e.g., memory 114 or storage 116) and configured to execute various instructions or operations. Additionally, for example, the server 110 or the processor 112 may be implemented as a special purpose computer or a special purpose processor configured (e.g., programmed) to execute instructions for performing any or all of the operations disclosed throughout. In some embodiments, the system 100 may include any suitable number of servers 110. The server 110 may be configured to host (e.g., run or execute) various software applications maintained (e.g., stored) in a non-transitory computer readable medium (e.g., memory 114 and/or storage 116) of the server 110. For example, the server 110 may be configured to host an aeronautical chart application and an ADS-B In application.

By executing the aeronautical chart application, the processor 112 may be configured to perform any of various operations. For example, the processor 112 may be configured to automatically select a particular aeronautical chart based on a flight plan or receive user input data (e.g., from the user input device 108) indicative of a selection for a particular aeronautical chart. For example, the particular aeronautical chart may be a departure procedure (DP) aeronautical chart, an enroute aeronautical chart (e.g., an IFR enroute aeronautical chart), a standard terminal arrival route (STAR) aeronautical chart, an airport diagram aeronautical chart, a taxi aeronautical chart (e.g., a low visibility taxi aeronautical chart), or an approach aeronautical chart (e.g., an instrument approach procedure aeronautical chart). Upon selection of the particular aeronautical chart, the processor 112 may be configured to generate aeronautical chart graphics data (e.g., an aeronautical chart file including graphics commands) associated with the selected aeronautical chart. The aeronautical chart graphics data may be geo-referenced such that a latitude and longitude associated with the selected aeronautical chart are accurate. The processor 112 may output the aeronautical chart graphics data to a display (e.g., an outboard primary flight display 102 and/or a center multi-function display 104).

By executing the ADS-B In application, the processor 112 may be configured to perform any of various operations. For example, the processor 112 of the server may be configured to receive ADS-B In data from the ADS-B receiver 118. The processor 112 may be configured to filter the received ADS-B In data so that the filtered ADS-B In data only includes a portion of the traffic in the vicinity of the ownship aircraft 200. For example, filtering of the received ADS-B In data to include only a portion of traffic may be based on (a) a default setting (e.g., traffic in proximity (e.g., within 60 miles of and within 5000 feet above or below the ownship aircraft 200) to the ownship aircraft 200), (b) a pilot-selectable setting (e.g., traffic above the ownship aircraft 200 which may be important during climbing procedures, traffic below the ownship aircraft 200 which may be important during descending procedures, or traffic on ground which may be important during taxi operations), or (c) a context driven setting. For example, the context driven setting may be a setting to filter the ADS-B In data based on (i) a selected aeronautical chart (e.g., selected by executing the aeronautical chart application) or (ii) a flight plan. For example, with respect to contextual driven filtering based on a selected aeronautical chart, if a pilot selects an airport chart, the processor 112 may filter the ADS-B In data to include only traffic on the ground; additionally, if a pilot selects an approach chart, the processor 112 may filter the ADS-B In data to include only traffic along an approach path at altitudes relevant to (e.g., within a predetermined distance from) the approach path. For example, with respect to contextual driven filtering based on a flight plan, the processor 112 may utilize the flight plan to predict a position of the ownship aircraft 200 in the near future, and the processor 112 may include only traffic relevant to (e.g., within a predetermined distance from) the future ownship aircraft position.

Still referring to execution of the ADS-B In application, the processor 112 may generate traffic graphics data (e.g., a filtered traffic information file including graphics commands) based on the filtered ADS-B In data. The traffic graphics data may be geo-referenced such that a latitude and longitude associated with the filtered traffic are accurate and match the latitude and longitude associated with the aeronautical chart. The processor 112 may output the traffic graphics data to a display (e.g., an outboard primary flight display 102 and/or a center multi-function display 104), which may be the same display that the aeronautical chart graphics data is output to.

In response to execution of the aeronautical chart application and the ADS-B In application, the display (e.g., an outboard primary flight display 102 and/or a center multi-function display 104) may receive the aeronautical chart graphics data, the traffic graphics data, and any other graphics data generated by execution of other applications hosted on the server 110. The display may merge the aeronautical chart graphics data, the traffic graphics data, and any other graphics data, as well as any graphics data generated by execution of applications hosted directly in the display. The display may render merged graphics into a display image(s) bounded by a current display range setting. The display image associated with the merged graphics may include an image of the selected aeronautical chart overlaid with ADS-B traffic information (e.g., ADS-B traffic targets).

In some embodiments, the server 110 may be certified by the FAA, though at least one application (e.g., the ADS-B In application) hosted by the server 110 may be uncertified by the FAA.

Figure 3:
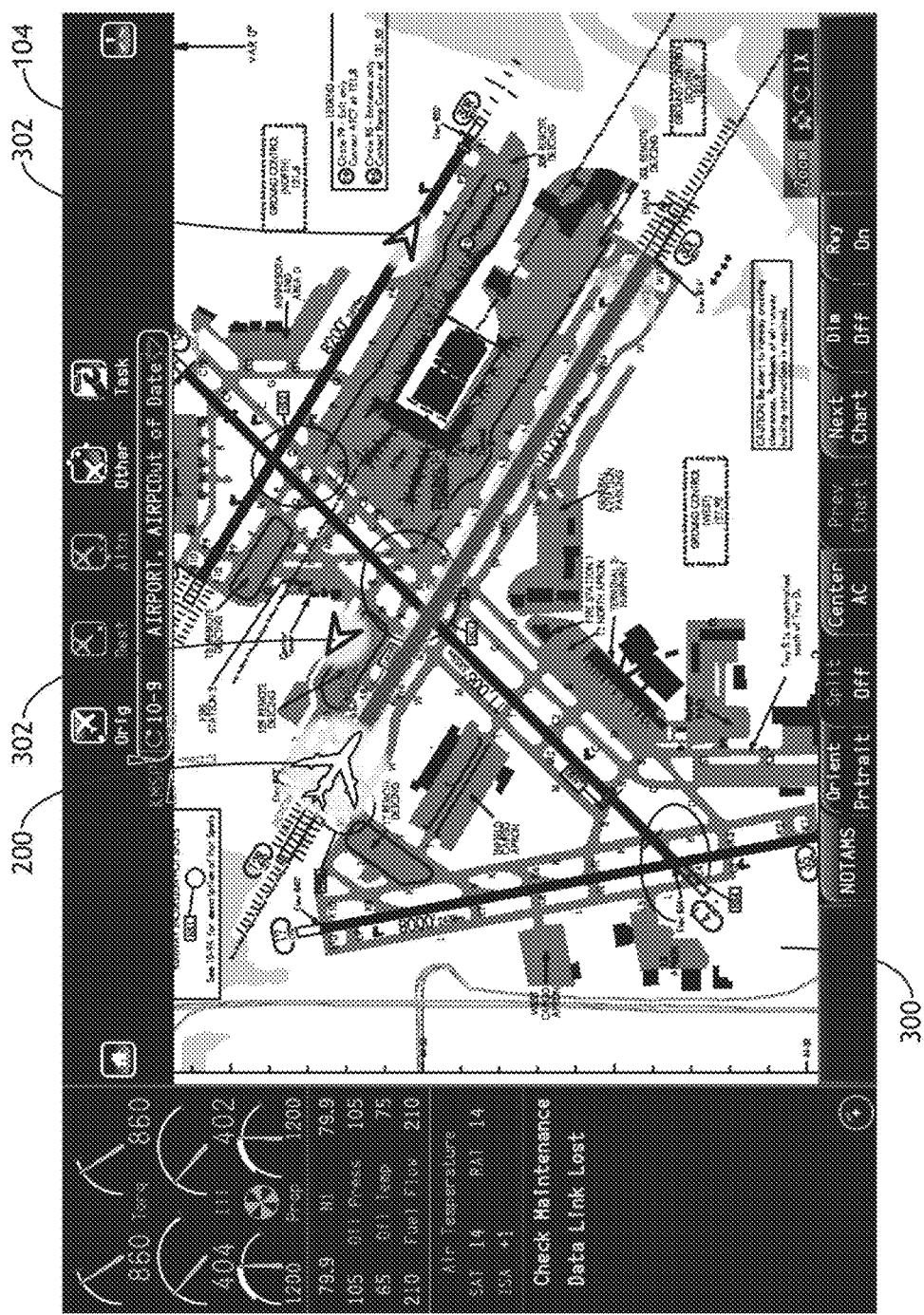
FIG. 3 is an exemplary view of the center multi-function display of FIGS. 1-2 according to the inventive concepts disclosed herein.

Referring now to FIG. 3, an exemplary view of the center multi-function display 104 of FIGS. 1-2 according to the inventive concepts disclosed herein is shown. The center multi-function display 104 may be configured to display an airport aeronautical chart 300 overlaid with ADS-B ground traffic targets 302 (including flight identifiers) and a position of the ownship aircraft 200.

Figure 4:
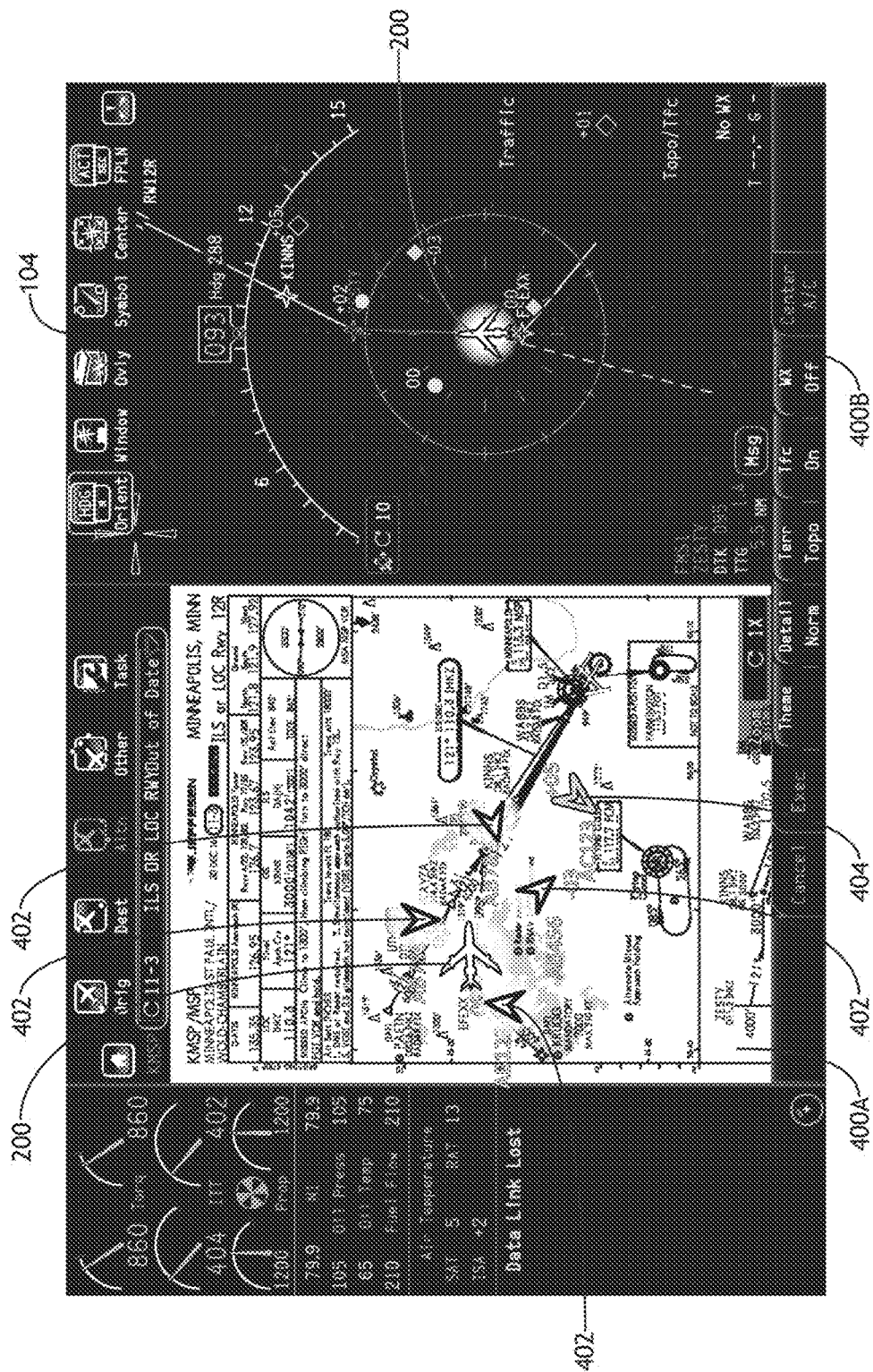
FIG. 4 is an exemplary view of the center multi-function display of FIGS. 1-2 according to the inventive concepts disclosed herein.

Referring now to FIG. 4, an exemplary view of the center multi-function display 104 of FIGS. 1-2 according to the inventive concepts disclosed herein is shown. The center multi-function display 104 may be configured to display an aeronautical chart 400A overlaid with ADS-B airborne proximate traffic targets 402 (including flight identifiers), airborne non-proximate traffic targets 404 (including flight identifiers), and a position of the ownship aircraft 200 in a first window. The center multi-function display 104 may be further configured to display a navigation map 400B overlaid with TCAS targets in a second window.

Figure 5:
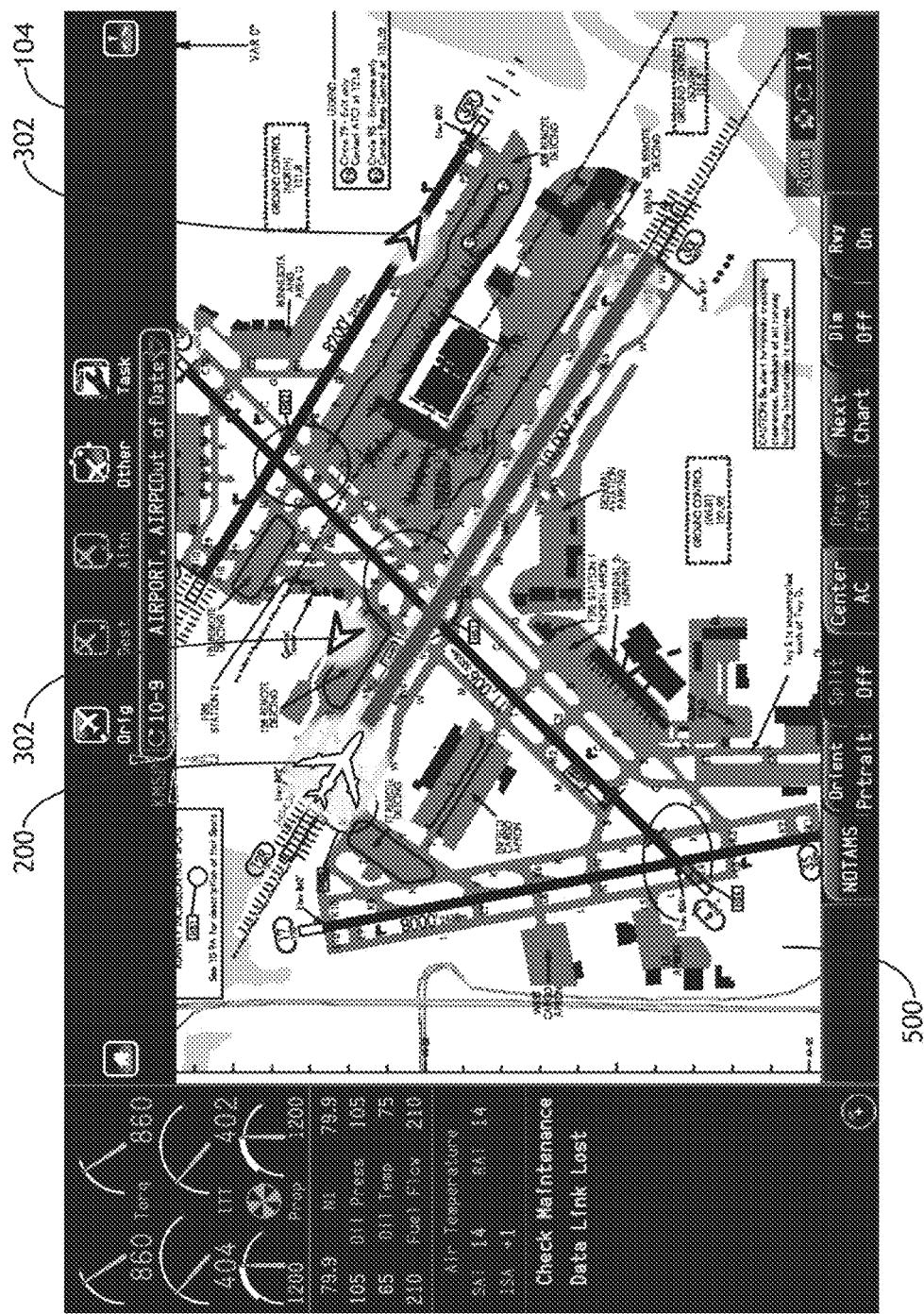
FIG. 5 is an exemplary view of the center multi-function display of FIGS. 1-2 according to the inventive concepts disclosed herein.

Referring now to FIG. 5, an exemplary view of the center multi-function display 104 of FIGS. 1-2 according to the inventive concepts disclosed herein is shown. The center multi-function display 104 may be configured to display an airport aeronautical chart 500 overlaid with ADS-B ground traffic targets 302 (excluding flight identifiers) and a position of the ownship aircraft 200.

Figure 6:
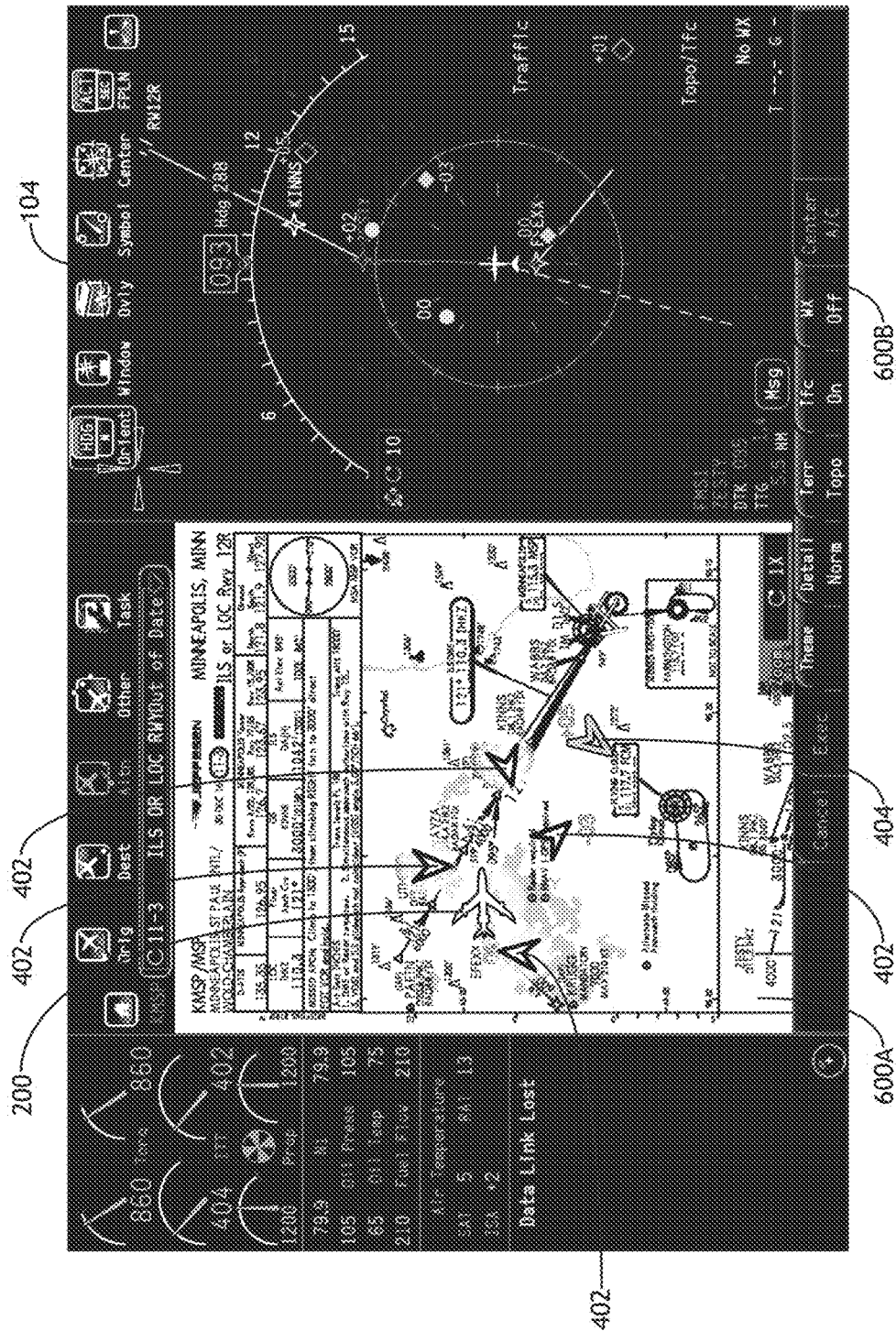
FIG. 6 is an exemplary view of the center multi-function display of FIGS. 1-2 according to the inventive concepts disclosed herein.

Referring now to FIG. 6, an exemplary view of the center multi-function display 104 of FIGS. 1-2 according to the inventive concepts disclosed herein is shown. The center multi-function display 104 may be configured to display an aeronautical chart 600A overlaid with ADS-B airborne proximate traffic targets 402 (excluding flight identifiers), airborne non-proximate traffic targets 404 (excluding flight identifiers), and a position of the ownship aircraft 200 in a first window. The center multi-function display 104 may be further configured to display a navigation map 600B overlaid with TCAS targets in a second window.

Figure 7:
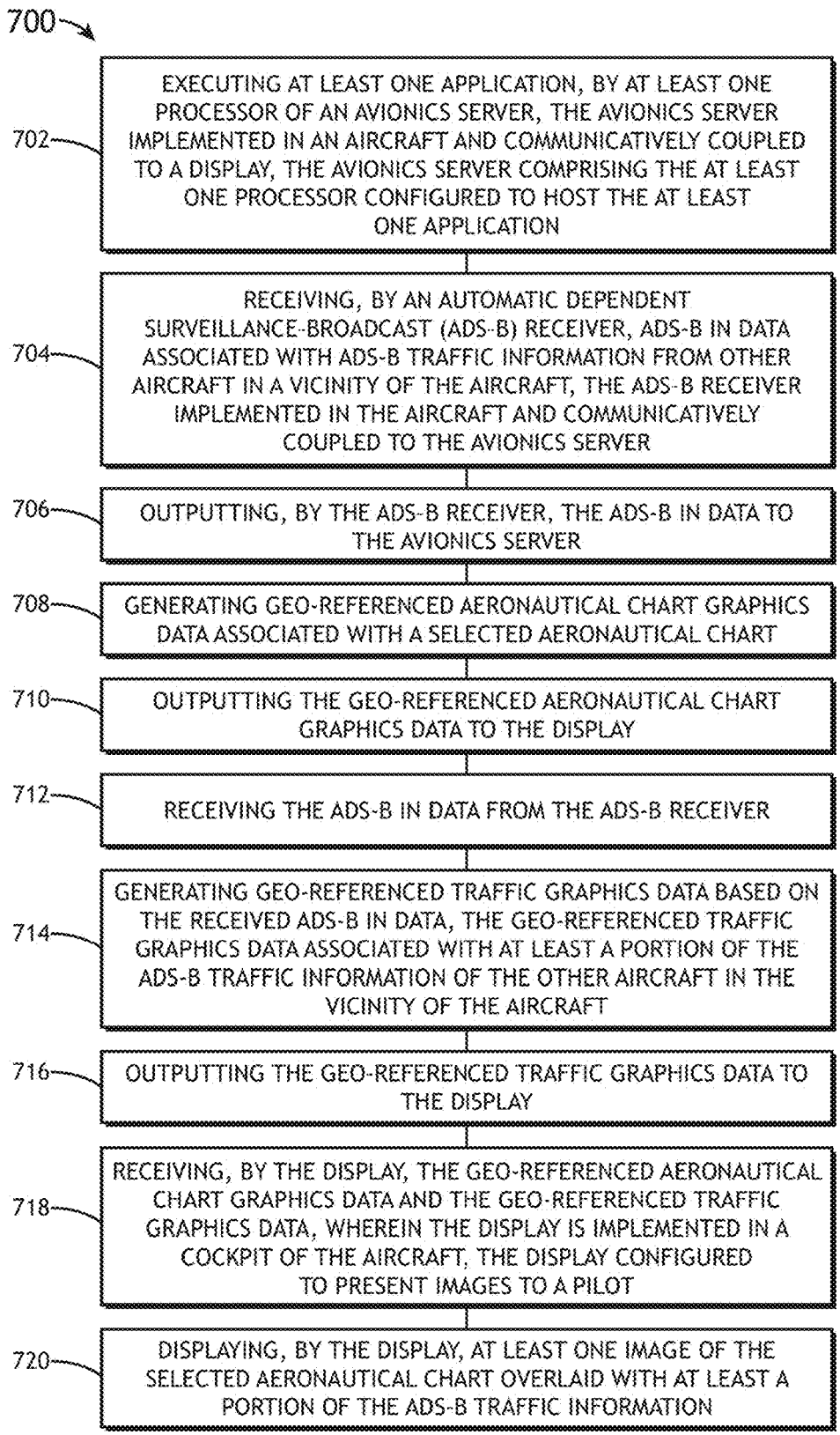
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Some embodiments may include performing one or more steps of the method 700 iteratively, concurrently, sequentially, and/or non-sequentially. Additionally, for example, some embodiments may include performing one or more instances of the method 700 iteratively, concurrently, and/or sequentially.

A step 702 may include executing at least one application, by at least one processor of an avionics server, the avionics server implemented in an aircraft and communicatively coupled to a display, the avionics server comprising the at least one processor configured to host the at least one application.

A step 704 may include receiving, by an automatic dependent surveillance-broadcast (ADS-B) receiver, ADS-B In data associated with ADS-B traffic information from other aircraft in a vicinity of the aircraft, the ADS-B receiver implemented in the aircraft and communicatively coupled to the avionics server.

A step 706 may include outputting, by the ADS-B receiver, the ADS-B In data to the avionics server.

A step 708 may include generating geo-referenced aeronautical chart graphics data associated with a selected aeronautical chart.

A step 710 may include outputting the geo-referenced aeronautical chart graphics data to the display.

A step 712 may include receiving the ADS-B In data from the ADS-B receiver.

A step 714 may include generating geo-referenced traffic graphics data based on the received ADS-B In data, the geo-referenced traffic graphics data associated with at least a portion of the ADS-B traffic information of the other aircraft in the vicinity of the aircraft.

A step 716 may include outputting the geo-referenced traffic graphics data to the display.

Steps 708, 710, 712, 714, and 716 may be performed by the at least one processor 112 of the server 110.

A step 718 may include receiving, by the display, the geo-referenced aeronautical chart graphics data and the geo-referenced traffic graphics data, wherein the display is implemented in a cockpit of the aircraft, the display configured to present images to a pilot.

A step 720 may include displaying, by the display, at least one image of the selected aeronautical chart overlaid with at least a portion of the ADS-B traffic information.

Further, the method 700 may include any of the operations disclosed throughout.

As will be appreciated from the above, embodiments of the inventive concepts disclosed herein may be directed to a method and system configured to display images of a selected aeronautical chart overlaid with ADS-B traffic information.

As used throughout and as would be appreciated by those skilled in the art, "at least one non-transitory computer-readable medium" may refer to as at least one non-transitory computer-readable medium (e.g., memory 114, storage 116, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft system, comprising:
a display implemented in a cockpit of an aircraft, the display configured to present images to a pilot;
an avionics server implemented in the aircraft and communicatively coupled to the display, the avionics server comprising at least one processor configured to host at least one application and execute the at least one application; and
an automatic dependent surveillance-broadcast (ADS-B) receiver implemented in the aircraft and communicatively coupled to the avionics server, the ADS-B receiver configured to receive ADS-B In data associated with ADS-B traffic information from other aircraft in a vicinity of the aircraft and output the ADS-B In data to the avionics server;
wherein execution of the at least one application is configured to cause the at least one processor to:
generate geo-referenced aeronautical chart graphics data associated with a selected aeronautical chart;
output the geo-referenced aeronautical chart graphics data to the display;
receive the ADS-B In data from the ADS-B receiver;
generate geo-referenced traffic graphics data based on the received ADS-B In data, the geo-referenced traffic graphics data associated with at least a portion of the ADS-B traffic information of the other aircraft in the vicinity of the aircraft; and
output the geo-referenced traffic graphics data to the display;
wherein the display is configured to:
receive the geo-referenced aeronautical chart graphics data and the geo-referenced traffic graphics data; and
display at least one image of the selected aeronautical chart overlaid with at least a portion of the ADS-B traffic information.

2. The system of claim 1, wherein the ADS-B receiver is uncertified by the Federal Aviation Administration.

3. The system of claim 1, wherein the at least one application comprises an ADS-B In application and an aeronautical chart application.

4. The system of claim 3, wherein the ADS-B In application is uncertified by the Federal Aviation Administration.

5. The system of claim 1, wherein the execution of the at least one application is further configured to cause the processor to filter the received ADS-B In data such that the filtered ADS-B In data only includes a portion of other aircraft traffic in the vicinity of the aircraft.

6. The system of claim 5, wherein filtering of the received ADS-B In data is based on traffic in proximity to the aircraft.

7. The system of claim 5, wherein filtering of the received ADS-B In data is based on a pilot selectable setting.

8. The system of claim 5, wherein filtering of the received ADS-B In data is based on traffic above the aircraft.

9. The system of claim 5, wherein filtering of the received ADS-B In data is based on traffic below the aircraft.

10. The system of claim 5, wherein filtering of the received ADS-B In data is based on traffic on the ground.

11. The system of claim 5, wherein filtering of the received ADS-B In data is based on a context driven setting.

12. The system of claim 11, wherein filtering of the received ADS-B In data is based on a selected aeronautical chart.

13. The system of claim 11, wherein filtering of the received ADS-B In data is based on a predicted future position of the aircraft based on flight plan of the aircraft.

14. The system of claim 1, wherein the display is further configured to merge the geo-referenced aeronautical chart graphics data and the geo-referenced traffic graphics data.

15. The system of claim 1, wherein the selected aeronautical chart is a departure procedure (DP) aeronautical chart, an enroute aeronautical chart, a standard terminal arrival route (STAR) aeronautical chart, an airport diagram aeronautical chart, a taxi aeronautical chart, or an approach aeronautical chart.

16. The system of claim 1, further comprising two primary flight displays, wherein the display and the two primary flight displays are implemented as forward displays in the cockpit, wherein the display is a center multi-function display.

17. The system of claim 1, further comprising a user input device configured to receive user inputs from the pilot.

18. The system of claim 1, further comprising a traffic collision avoidance system (TCAS) receiver, wherein the display is further configured to display a navigation map overlaid with TCAS targets, wherein symbology for the TCAS targets is distinct from symbology for ADS-B targets of the ADS-B traffic information.

19. An aircraft system, comprising:
a display implemented in a cockpit of an aircraft, the display configured to present images to a pilot, wherein the display is a multi-function display;
an avionics server implemented in the aircraft and communicatively coupled to the display, the avionics server comprising at least one processor configured to host an ADS-B In application and an aeronautical chart application and execute the ADS-B In application and the aeronautical chart application; and
an automatic dependent surveillance-broadcast (ADS-B) receiver implemented in the aircraft and communicatively coupled to the avionics server, the ADS-B receiver configured to receive ADS-B In data associated with ADS-B traffic information from other aircraft in a vicinity of the aircraft and output the ADS-B In data to the avionics server, wherein the ADS-B receiver is uncertified by the Federal Aviation Administration;

wherein execution of the ADS-B In application and the aeronautical chart application is configured to cause the at least one processor to:

generate geo-referenced aeronautical chart graphics data associated with a selected aeronautical chart;

output the geo-referenced aeronautical chart graphics data to the display;

receive the ADS-B In data from the ADS-B receiver;

generate geo-referenced traffic graphics data based on the received ADS-B In data, the geo-referenced traffic graphics data associated with at least a portion of the ADS-B traffic information of the other aircraft in the vicinity of the aircraft; and output the geo-referenced traffic graphics data to the display;

wherein the display is configured to:

receive the geo-referenced aeronautical chart graphics data and the geo-referenced traffic graphics data; and display at least one image of the selected aeronautical chart overlaid with at least a portion of the ADS-B traffic information.

20. A method of operating an aircraft system, comprising:

executing at least one application, by at least one processor of an avionics server, the avionics server implemented in an aircraft and communicatively coupled to a display, the avionics server comprising the at least one processor configured to host the at least one application;

receiving, by an automatic dependent surveillance-broadcast (ADS-B) receiver, ADS-B In data associated with ADS-B traffic information from other aircraft in a vicinity of the aircraft, the ADS-B receiver implemented in the aircraft and communicatively coupled to the avionics server;

outputting, by the ADS-B receiver, the ADS-B In data to the avionics server;

wherein execution of the at least one application causes the at least one processor to perform operations, the operations comprising:

generating geo-referenced aeronautical chart graphics data associated with a selected aeronautical chart;

outputting the geo-referenced aeronautical chart graphics data to the display;

receiving the ADS-B In data from the ADS-B receiver;

generating geo-referenced traffic graphics data based on the received ADS-B In data, the geo-referenced traffic graphics data associated with at least a portion of the ADS-B traffic information of the other aircraft in the vicinity of the aircraft; and outputting the geo-referenced traffic graphics data to the display;

receiving, by the display, the geo-referenced aeronautical chart graphics data and the geo-referenced traffic graphics data, wherein the display is implemented in a cockpit of the aircraft, the display configured to present images to a pilot; and displaying, by the display, at least one image of the selected aeronautical chart overlaid with at least a portion of the ADS-B traffic information.

\* \* \* \* \*